Patented May 15, 1945

2,375,964

UNITED STATES PATENT OFFICE 2,375,964

OIL-SOLUBLE RESINS

Victor H. Turkington, Mountain Lakes, and William H. Butler, Bloomfield, N. J., assignors to Bakelite Corporation, New York, N. Y., a corporation of New Jersey No Drawing. Application April 1, 1942, Serial No. 437,290

10 Claims. (Cl. 260—51)

This invention relates to phenolic resins soluble in or miscible with fatty oil, such as the drying oils. More particularly, it relates to the preparation of oil-soluble resins of improved properties from aryl substituted phenols as well as monohydric dialkyl phenols of the group consisting of xylenols, their homologues and admixtures thereof, and particularly from tar acids comprising xylenols, their homologues and admixtures thereof.

In order that resins may be dissolved in or mixed with fatty oils, they must have the property of softening or fusing on heating in the presence of the oils to a sufficient extent to become dispersed therein. In order that the dispersion of resin in oil thus obtained be commercially useful as a varnish or as a paint vehicle the dispersion must be stable and must not separate from the oil under the conditions of technical practice, such as the addition of turpentine or other thinners commonly used in the varnish or paint industry.

The degree of fusibility permissible in the resin is limited by commercial requirements of durability, drying power and resistance of the film to moisture, alkalies and acids. In general these properties are improved with decreased fusibility or increased melting point.

We have found that resins which are soluble in drying oils and which at the same time, when incorporated with a drying oil, such as Chinawood oil, provide a rapid drying varnish film, very durable to weathering and of excellent alkali- and water-resistance, may be obtained by reacting tar acids containing xylenols and their homologues with aldehydes. In order to obtain satisfactory resins from such tar acids, however, it is necessary to observe certain conditions which characterize the process of the invention.

It has been found to be particularly advantageous to separate the tar acids into fractions containing substantially only phenols of similar reactivity with aldehydes, such as formaldehyde. By isolating tar acid fractions substantially homogeneous with respect to reactivity with aldehydes, it is possible to carry the reaction of substantially all of the tar acid to a stage at which oil-solubility is combined with a high degree of durability, moisture-resistance and similar desirable properties in the resultant varnish. In general, the reactivity of xylenols with aldehydes, such as formaldehyde, increases in the following order: 2.4 xylenol, 2.5 xylenol, 2.3 xylenol, 3.4 xylenol and 3.5 xylenol (Chemical Abstracts nomenclature). In general, the severity of the reaction conditions with respect to time, temperature, amount and kind of catalyst and proportion of aldehydic substance should be decreased with the various xylenols in the order named. It is not necessary, however, that the individual xylenols be isolated as certain of them are of substantially similar reactivity with formaldehyde. Moreover other polyalkyl phenols may be present in the reaction mixture with certain xylenols of similar reactivity and in certain cases result in resins of very desirable properties; for example, trimethyl phenol and 3.4 xylenol.

The presence of solvents or diluents in the reaction, such as have heretofore been suggested to render phenolic resins soluble in fatty oils, is to be avoided. The addition of rosin to the reaction, for example, results in the formation of products of inferior hardness and of low durability when made into coating compositions with fatty oils.

Acid catalysts are preferably used to accelerate the reaction of the tar acids with aldehydes. Catalysts which volatilize or decompose on heating to a temperature of 200° C., for example, hydrochloric acid or oxalic acid, are preferable.

The principles of the invention are illustrated by the following examples:

*Example 1.*—100 grams of a tar acid fraction consisting of approximately equal parts by weight of 2.4 and 2.5 xylenols is reacted under a reflux with 54 grams of a 37% aqueous solution of formaldehyde, in the presence of 1 gram of oxalic acid as a catalyst, at atmospheric pressure for about 4 hours. The resin is then dehydrated by heating to about 150° C. The resulting resin has a melting point of about 92° C. and is soluble in drying oils, such as China-wood oil, to give a useful varnish.

*Example 2.*—100 grams of a tar acid fraction containing approximately 60 grams 3.5, 35 grams 3.4 and 5 grams 2.3 xylenols is refluxed with 43 grams of a 37% aqueous formaldehyde and 1 gram oxalic acid at atmospheric pressure for a period of two hours. The resin is dehydrated by heating to a temperature of 140° C. and has a melting point of about 93.5° C., and is soluble in drying oils to give a highly satisfactory varnish.

*Example 3.*—A satisfactory oil-soluble resin is obtained by reacting 100 grams of a tar acid fraction containing about 75 grams of 3.4 xylenol and 25 grams trimethyl-phenol with 54 grams of 37% aqueous formaldehyde and 1 gram of oxalic acid at atmospheric pressure for three hours. The resin is dehydrated by heating to a temperature of 140° C. and has a melting point of about 100° C.

*Example 4.*—A useful oil-soluble resin can be prepared from 3.5 xylenol alone by reacting with formaldehyde; for instance, 100 grams of meta-xylenol are reacted with 43 grams of 37% aqueous formaldehyde and 0.25 gram of hydrochloric acid at atmospheric pressure for about 1½ hours. The resin is dehydrated by heating to 140° C. and has a melting point of about 93° C. The resin is characterized by fusibility so that it can be cooked with tung oil and thinners thereafter included without precipitation of the resin.

*Example 5.*—60 grams of a mixture of polyalkyl phenols such as diethyl phenol, dipropyl phenol, etc., which have been isolated from petroleum tar acid fractions, are reacted together with 55 grams of 37% aqueous formaldehyde and 1 gram of oxalic acid under pressure of 25 to 40 lbs. per square inch and at a temperature of 125° C. for 2 hours. Dehydrating the reaction products results in a soft viscous type resin soluble in drying oils. A higher melting point and brittle resin is produced by adding to the foregoing undehydrated reaction products which have been cooled to 60° C., 40 grams of 3.5 xylenol and then reacting at 100° C. for 2 hours at atmospheric pressure. The reaction products are then dehydrated by heating to 130° C. under reduced pressure. The resultant product is a brittle resin having a melting point between 110° C. and 121° C., soluble in drying oils, yielding varnishes which dry more rapidly and are harder than varnishes produced from drying oils and the dehydrated resin produced in the first part of this example.

*Example 6.*—40 grams of ortho phenyl phenol are reacted with 30 grams of 37% aqueous formaldehyde and 0.8 gram of oxalic acid in a closed vessel at a temperature of 150° C. and a reaction pressure of 100 pounds per square inch for a period of 2½ hours. The reaction is then cooled to 60° C. and 60 grams of paraphenyl phenol and 45 grams of 37% aqueous formaldehyde solution are added. The reaction is then continued for 3 hours at 125° C. under a pressure of 25 to 35 pounds per square inch. The reaction products are then dehydrated by heating to 125° C. The resulting reaction product is a resin with a melting point of 105° C. to 116° C. and the condensation of the aryl substituted phenols and formaldehyde is found to be substantially complete. The resinous product is soluble in drying oils and yields films which are more chemically resistant than the reaction products which are obtained by reacting simultaneously together both aryl substituted phenols with formaldehyde.

In the above examples the reaction may be carried on under pressure or vacuum and without refluxing, if desired, and various methylene or substituted methylene bodies, such as acetaldehyde, benzaldehyde, furfuraldehyde, ketones and the like may be used in place of formaldehyde or its substantial equivalent hexamethylenetetramine, in whole or in part, the time of reaction, temperature and proportions of ingredients being adjusted to produce a resin having the characteristics of those obtained by proceeding in accordance with the previous examples. In general from one-half to somewhat less than one mol, preferably from 0.6 to 0.95 mol, of methylene body is used for each mol of phenolic body, although more than one mol of methylene body may be present if the reaction conditions are made less vigorous, as by shortening the reaction period or reducing the amount of catalyst.

While the foregoing resins are satisfactory both from the standpoint of oil-solubility and utility, marked improvements are obtained by submitting them to a further treatment after dehydration. This further treatment comprises subjecting the resins to the action of a gas or vapor, such as steam, volatile aromatic and aliphatic hydrocarbons, such as toluene, benzene, xylene, mineral spirits and the like, or an inert gas at a relatively high temperature, for example, 150° C. to 250° C.

Steam distillation is most satisfactory, for unreacted phenols that are carried over are readily separated due to their slight solubility. Treatment with steam at about 180° C., with a gradual increase to about 220° C. at atmospheric pressure, has been found advantageous; reduced or higher pressures, however, can be used. The resins thus treated are improved generally, are free from objectionable odor, and though more easily dissolved in oil, yet they show higher melting points and consequently yield more durable films. The resin of Example 1, for instance, when steam treated in this way, has a melting point of about 105° C.; that of example 2, about 125° C.; and that of Example 3, about 140° C.

The condensation products, in the fusible condition and preferably after steam treatment, may be incorporated with fatty oils, for example, drying or semi-drying oils, such as tung oil, by heating a mixture of the condensation product and oil to 200° C. or higher until the solution is completed. The heating may be continued until the desired viscosity or "body" is obtained. Suitable solvents, such as petroleum thinner, turpentine and other solvents commonly used in varnish, may then be added. After cooling, the varnish so formed is ready for use. Metallic driers, such as cobalt linoleate or manganese linoleate, may be incorporated in the customary manner, less than the usual amounts being required. Pigments and coloring materials may also be added.

The hereindescribed condensation products are not only oil-soluble in themselves, but they can be used to some extent as substitutes for natural resins to render phenol-formaldehyde or other synthetic resins soluble in oils. On the other hand, the hereindescribed condensation products may be diluted with the natural resins, such as rosin, Congo, dammar, copal, etc., without an adverse effect on their oil-solubility, although the natural resins detract somewhat from the other desirable qualities of the xylenol condensation products by reducing the resistance to weathering and increasing the drying time.

Tung or China-wood oil is typical of the fatty oils in which the hereindescribed condensation products are soluble or miscible; but other fatty oils, both non-drying and drying, are also miscible with or solvents for these condensation products. Such oils are perilla, cottonseed, soya bean, corn, fish, and other oils, in addition to those previously mentioned. Free fatty acids, such as oleic, linolic, linolenic and the like, are miscible with and solvents for these condensation products and may be included in compositions containing them.

Resins prepared from the various tar acid fractions differ somewhat in their durability and water- and alkali-resistance, and it is often advantageous to control these properties by blending together resins made from different fractions.

Blended resins soluble in drying oils and possessing desirable properties may also be obtained by reacting xylenols of different reactivity with aldehydes successively in the same reaction mass in the order of their increasing reactivity. For example, a mixture of approximately equal parts of 2,4 and 2,5 xylenols may be reacted with a proper amount of formaldehyde as set forth in Example 1 above to approximately complete reaction, or somewhat less, and thereafter 3,5 xylenol, for example, either alone or together with other similarly reactive xylenols, may be added to the reaction mass, together with additional formaldehyde, in the proportion set forth in Example 2, and the reaction continued until the added xylenols have substantially completely reacted. Control of the reaction in the different stages may be effected by controlling the amount and character of the catalyst present, the proportion of formaldehyde present and the time and temperature of the reaction. One hundred parts of a resin prepared as just described were cooked with 200 parts China-wood oil at 235° C. for 34 minutes, then thinned with a petroleum solvent to a solids content of 42% and suitable proportion of drier added. This varnish air dried tack free in 6 to 7 hours to a hardness of 7 to 11 on the Sward hardness tester, and was resistant to 4¼ hours immersion in 5% sodium hydroxide aqueous solution.

Thus, by separating a tar acid containing xylenols and their homologues into fractions containing only phenol substances of substantially similar rate of reactivity with formaledhyde, it is possible by successively adding the fractions to the reaction mixture in the order of increasing reactivity with formaldehyde, as described above, to bring about substantially complete reaction of the phenolic substances in the tar acid to a hard, high melting point resin which is completely soluble in drying oils to form varnish compositions of high durability. By operating in this manner, both the yield and the quality of the resinous product obtainable from tar acids may be very greatly improved.

The xylenols may be accompanied or substituted by their homologues, for instance the diethyl, dipropyl, the ethyl propyl, dibutyl, diamyl, or dioctyl phenols, etc. These homologues are, in general, slower in reacting with methylene-containing agents; consequently it is desirable that the proportion of methylene agent of the time of reaction be increased or a more reactive methylene agent or catalyst be used.

In a similar manner the aryl substituted phenols may be reacted with formaldehyde or other methylene containing agents. Thus, it has been found that in general the ortho substituted aryl phenols have a slower reactivity than para substituted aryl phenols with formaldehyde or other methylene containing agents. However, by first reacting the ortho substituted phenol with a methylene containing agent and then later adding a faster reacting phenol such as a para substituted aryl phenol or a fast reacting alkyl phenol with additional formaldehyde, resinous products characterized by a high melting point and complete solubility in drying oils form varnishes which dry rapidly to hard tough films.

In general, the resinous products of the present invention are characterized by their hardness at ordinary temperatures, by their high melting points of 90° C. or over, and by their solubility in fatty oils to form coating compositions of great resistance to weather.

Coating compositions prepared with these products are characterized by a marked improvement over coating compositions not containing them. As little as five to ten per cent of the condensation products of the invention added to the previously mentioned fatty oils produces a noticeably tougher and more durable film, which characteristics are further improved in accordance with the amount of condensation product added. There is no critical limit to the proportion of oil in which the fusible condensation products may be dissolved or mixed; in general, the proportions vary from 10 to 50 per cent of resin content. The properties of the oil resin compositions prepared as previously described peculiarly adapt them for coating leather and fabrics used for auto tops, tents, golf club handles and the like, and generally for all outdoor purposes.

This application is a continuation-in-part of the application Serial No. 204,216, filed April 25, 1938, and of the application Serial No. 757,066; filed December 11, 1934.

What is claimed is:

1. Process for the production of oil-soluble resins of high melting point from tar acids containing xylenols and their homologues which comprises separating the tar acids into phenolic fractions of substantially similar rate of reactivity with formaldehyde and successively reacting by heating to a reaction temperature in the presence of an acidic catalyst said fractions with formaldehyde in the order of increasing reactivity of the fractions with formaldehyde and in the presence of the previously reacted fractions of lower reactivity.

2. Process for the production of oil-soluble resins of high melting point from tar acids containing a plurality of monohydric polyalkyl phenols having alkyl substituents with at least two carbon atoms of different rates of reactivity with formaldehyde which comprises separating the tar acids into phenolic fractions of substantially similar rate of reactivity with formaldehyde and successively reacting by heating to a reaction temperature in the presence of an acidic catalyst said fractions with formaldehyde in the order of increasing reactivity of the fractions with formaldehyde and in the presence of the previously reacted fractions of lower reactivity.

3. Process for the production of oil-soluble resins of high melting point from a plurality of xylenols, of different rates of reactivity with formaldehyde which comprises successively reacting by heating to a reaction temperature in the presence of an acidic catalyst the xylenols with formaldehyde in the order of increasing reactivity of the xylenols with formaldehyde and in the presence of the previously reacted xylenols of lower reactivity.

4. Process for the production of oil-soluble resins of high melting point from a plurality of monohydric polyalkyl phenols of different rates of reactivity with formaldehyde which comprises successively reacting by heating to a reaction temperature in the presence of an acidic catalyst the polyalkyl phenols with formaldehyde in the order of increasing reactivity of the phenols with formaldehyde and in the presence of the previously reacted phenols of lower reactivity.

5. Process for the production of oil-soluble resins of high melting point from a plurality of monohydric dialkyl phenols, of different rates of reactivity with formaldehyde which comprises successively reacting by heating to a reaction temperature in the presence of an acidic catalyst the phenols with formaldehyde in the order of increasing reactivity of the phenols with formaldehyde and in the presence of the previously reacted phenols of lower reactivity.

6. Process for the production of oil-soluble resins of high melting point from a plurality of phenols of the group consisting of aryl phenols and monohydric polyalkyl phenols of different rates of reactivity with formaldehyde which comprises successively reacting by heating to a reaction temperature in the presence of an acidic catalyst the phenols with formaldehyde in the order of increasing reactivity of the phenols with formaldehyde and in the presence of the previously reacted phenols of lower reactivity.

7. Process for the production of oil-soluble resins of high melting point from a plurality of phenyl phenols of different rates of reactivity with formaldehyde which comprises successively reacting by heating to a reaction temperature in the presence of an acidic catalyst the phenols with formaldehyde in the order of increasing reactivity of the phenols with formaldehyde and in the presence of the previously reacted phenols of lower reactivity.

8. Process for the production of oil-soluble resins of high melting point from a plurality of xylenols of different rates of reactivity with formaldehyde which comprises initially reacting by heating to a reaction temperature in the presence of an acidic catalyst a mixture of 2.4 and 2.5 xylenols with less than a molecular proportion of formaldehyde, then adding thereto 3.5 xylenol and additional formaldehyde, and continuing the reaction until upon dehydration a brittle, oil-soluble resin is formed.

9. Process for the production of oil-soluble resins of high melting point from a plurality of monohydric dialkyl phenols of different rates of reactivity with formaldehyde which comprises initially reacting by heating to a reaction temperature in the presence of an acidic catalyst a mixture of monohydric dialkyl phenols having more than one carbon atom in each alkyl group with more than a molecular proportion of formaldehyde, then adding thereto 3.5 xylenol in slight excess over the amount to molecularly combine with the free formaldehyde present in the initial reaction, and continuing the reaction until upon dehydration a brittle, oil-soluble resin is formed.

10. Process for the production of oil-soluble resins of high melting point from a plurality of xylenols and trimethyl phenols of different rates of reactivity with formaldehyde which comprises successively reacting by heating to a reaction temperature in the presence of an acidic catalyst the said alkyl phenols with formaldehyde in the order of increasing reactivity of the alkyl phenols with formaldehyde and in the presence of the previously reacted alkyl phenols of lower reactivity.

VICTOR H. TURKINGTON.
WILLIAM H. BUTLER.